(12) United States Patent
Balcazar

(10) Patent No.: US 9,945,213 B2
(45) Date of Patent: Apr. 17, 2018

(54) SCREEN AND METHOD OF MAKING THE SAME

(71) Applicant: Omar H. Balcazar, Houston, TX (US)

(72) Inventor: Omar H. Balcazar, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/449,540

(22) Filed: Mar. 3, 2017

(65) Prior Publication Data

US 2017/0175495 A1    Jun. 22, 2017

Related U.S. Application Data

(62) Division of application No. 13/692,526, filed on Dec. 3, 2012.

(51) Int. Cl.
| | |
|---|---|
| *E21B 43/08* | (2006.01) |
| *B01D 29/00* | (2006.01) |
| *B01D 35/02* | (2006.01) |
| *B23K 1/00* | (2006.01) |
| *C25F 5/00* | (2006.01) |

(52) U.S. Cl.
CPC ........ *E21B 43/082* (2013.01); *B01D 29/0093* (2013.01); *B01D 35/02* (2013.01); *B23K 1/0008* (2013.01); *C25F 5/00* (2013.01); *B01D 2101/005* (2013.01); *B01D 2221/04* (2013.01)

(58) Field of Classification Search
CPC .. B01D 24/001; B01D 29/0093; B01D 35/02; B01D 2101/005; B01D 2221/04; E21B 43/08; E21B 43/082; E21B 43/10; C25F 3/00; C25F 5/00; C25F 7/00; B23K 1/0014; B23K 1/0008; B23K 26/211; B23K 26/323; B23K 35/0244; B23K 35/302; B23K 2201/04; B23K 2201/24; B23K 2201/20; B23K 2201/22
See application file for complete search history.

(56) References Cited

U.S. PATENT DOCUMENTS

| | | | |
|---|---|---|---|
| 3,615,900 A | * | 10/1971 | Lee .................... B01D 67/0058 148/671 |
| 5,104,539 A | | 4/1992 | Anderson et al. |
| 5,734,092 A | | 3/1998 | Wang et al. |
| 6,092,604 A | * | 7/2000 | Rice ........................ E21B 43/08 166/228 |

(Continued)

FOREIGN PATENT DOCUMENTS

| | | |
|---|---|---|
| JP | 09155157 | 6/1997 |
| JP | 2010240568 A | 10/2010 |

OTHER PUBLICATIONS

Calhoun, Jr. Et Al., "A Study of the Flow of Homogeneous Fluids Through Ideal Porous Media"; American Petroleum Institute; Conference paper 46-335; Drilling and Production Practice, 1946; pp. 335-355.

(Continued)

*Primary Examiner* — Lucas Stelling
(74) *Attorney, Agent, or Firm* — Cantor Colburn LLP

(57) ABSTRACT

A screen includes a framework of a first material having one or more openings therethrough defining a fluidic filter, and a substance of a second material positioned within the one or more openings in the framework and configured to be removable from the framework during an electrochemical reaction.

9 Claims, 3 Drawing Sheets

(56) References Cited

U.S. PATENT DOCUMENTS

| | | | |
|---|---|---|---|
| 6,116,085 A | | 11/2000 | Moffatt et al. |
| 6,649,559 B2* | | 11/2003 | Drost .................. B01D 53/228 428/116 |
| 2002/0028345 A1* | | 3/2002 | Kempf ................ B01D 53/228 428/670 |
| 2003/0034250 A1 | | 2/2003 | Hey et al. |
| 2010/0006495 A1 | | 1/2010 | Buschmann et al. |
| 2010/0116733 A1 | | 5/2010 | Jeong |
| 2011/0073307 A1* | | 3/2011 | Miller ..................... E21B 27/00 166/268 |
| 2014/0151287 A1 | | 6/2014 | Balcazar |

OTHER PUBLICATIONS

Cole Et Al, "A Study of the Properties, Installation, and Performance of Sintered Metal Gravel-Pack Screens"; Offshore Technology Conference; Conference Paper 7012-MS; Offshore Technology Conference, May 4-May 7, 1992; pp. 269-280.

Cole Et Al, "Design and Application of Sintered Porous Stainless Steel Well Screens in Sand Control Completions"; Society of Petroleum Engineers; Conference Paper 23770-MS; SPE Formation Damage Control Symposium, Feb. 26-27, 1992; pp. 55-66.

Dictionary defintion of "deposited" from Onelook.com (obtained Aug. 2016).

Examiner conducted google search, May 31, 2014.

Notification of Transmittal of the International Search Report and the Written Opinion of the International Searching Authority, or the Declaration; PCT/US2013/067253; dated Oct. 18, 2013; 9 pages.

Oxford dictionaries definition of "occlude"; retrieved May 28, 2015.

Zhang, Galvanic Corrosion, Uhlig's Corrosion Handbook, Third Edition, John Wiley and Sons 2011, figure in p. 128, from S.M. Wilhelm, "Galvanic Corrosion Caused by Corrosion Products," ASTM, 1988.

* cited by examiner

SCREEN AND METHOD OF MAKING THE SAME

CROSS REFERENCE TO RELATED APPLICATIONS

This is divisional application claims the benefit of an earlier fling date from U.S. Non-provisional application Ser. No. 13/692,526 filed on Dec. 3, 2012, the entire disclosure of which is incorporated herein by reference.

BACKGROUND

Screens for filtering fluid flowable therethrough are common, and are made by a wide variety of methods. Some screens are initially plugged and are opened to flow after a selected time period. Such a configuration is sometimes desirable since it allows an operator to perform certain operations while the screen is plugged and then other operations later when the screen is open to flow therethrough. Although screens that perform in this manner serve the purpose for which they are employed. New screen configurations that are initially plugged and subsequently open to flow are always of interest to those in the art.

BRIEF DESCRIPTION

Disclosed herein is a screen. The screen includes a framework of a first material having one or more openings therethrough defining a fluidic filter, and a substance of a second material positioned within the one or more openings in the framework and configured to be removable from the framework during an electrochemical reaction.

Further disclosed herein is a method of making a screen. The method includes brazing particles within a bore of a plug with a filler metal of a first material, wherein the particles are made of a second material and the plug of a third material, and exposing the particles, the plug and the filler metal to a fluid, allowing an electrochemical reaction to occur, and removing the particles. Additionally, the second material is more anodic than either of the first material or the third material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
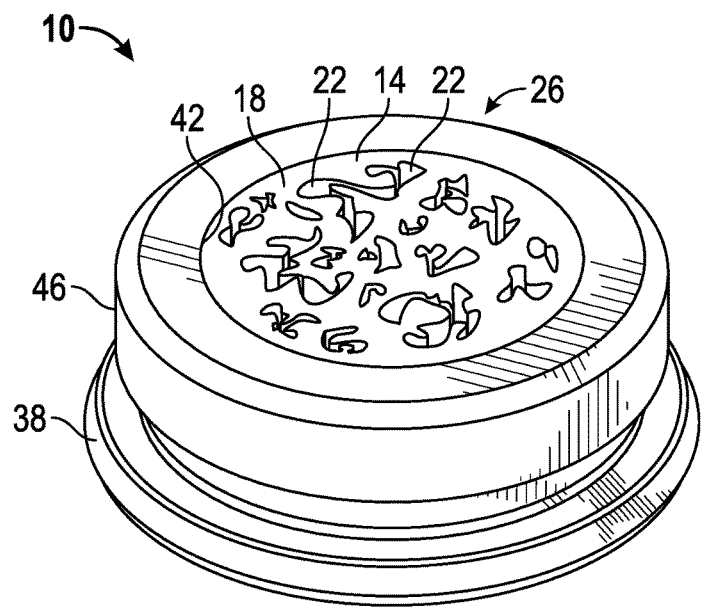
FIG. 1 depicts a perspective view of a screen disclosed herein with a substance removed from a framework.
Figure 2:
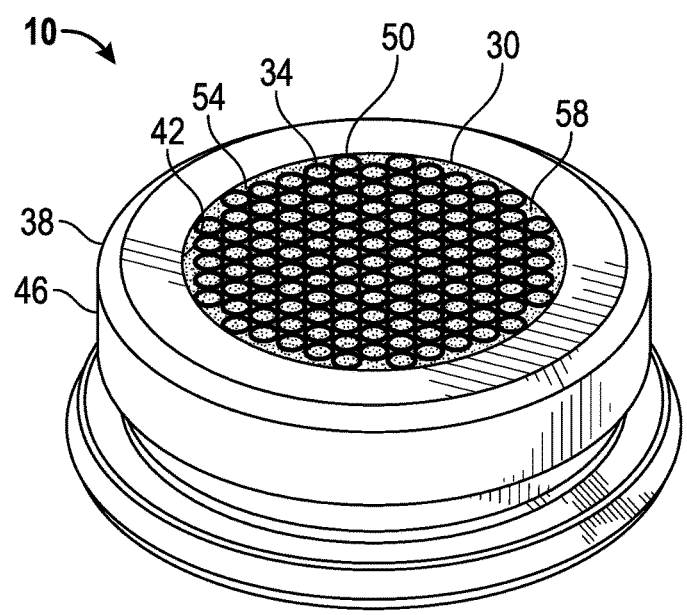
FIG. 2 depicts a perspective view of the screen of FIG. 1 with particles of a second material shown and the framework removed.

Referring to FIGS. 1 and 2, an embodiment of a screen disclosed herein is illustrated at 10. The screen 10 includes a framework 14 (FIG. 1 only) of a first material 18 having one or more openings 22, with a plurality of the openings 22 being illustrated in this embodiment, that define a fluidic filter 26 and a substance 30 of a second material 34 (FIG. 2 only) that will define the openings 22 as will be discussed in detail hereunder. The substance 30 is configured to be removable from the framework 14 during an electrochemical reaction. The second material 34 is selected to be more anodic than the first material 18 to assure that the second material 34 is removed instead of the first material 18 during an electrochemical reaction as occurs when the screen 10 is exposed to a fluid including an electrolyte. The substance 30 when present in the openings 22 blocks flow of fluid through the openings 22 while once removed allows fluid to flow through a tortuous path defined by the openings 22 to thereby filter fluid flowing therethrough in the process.

Figure 3:
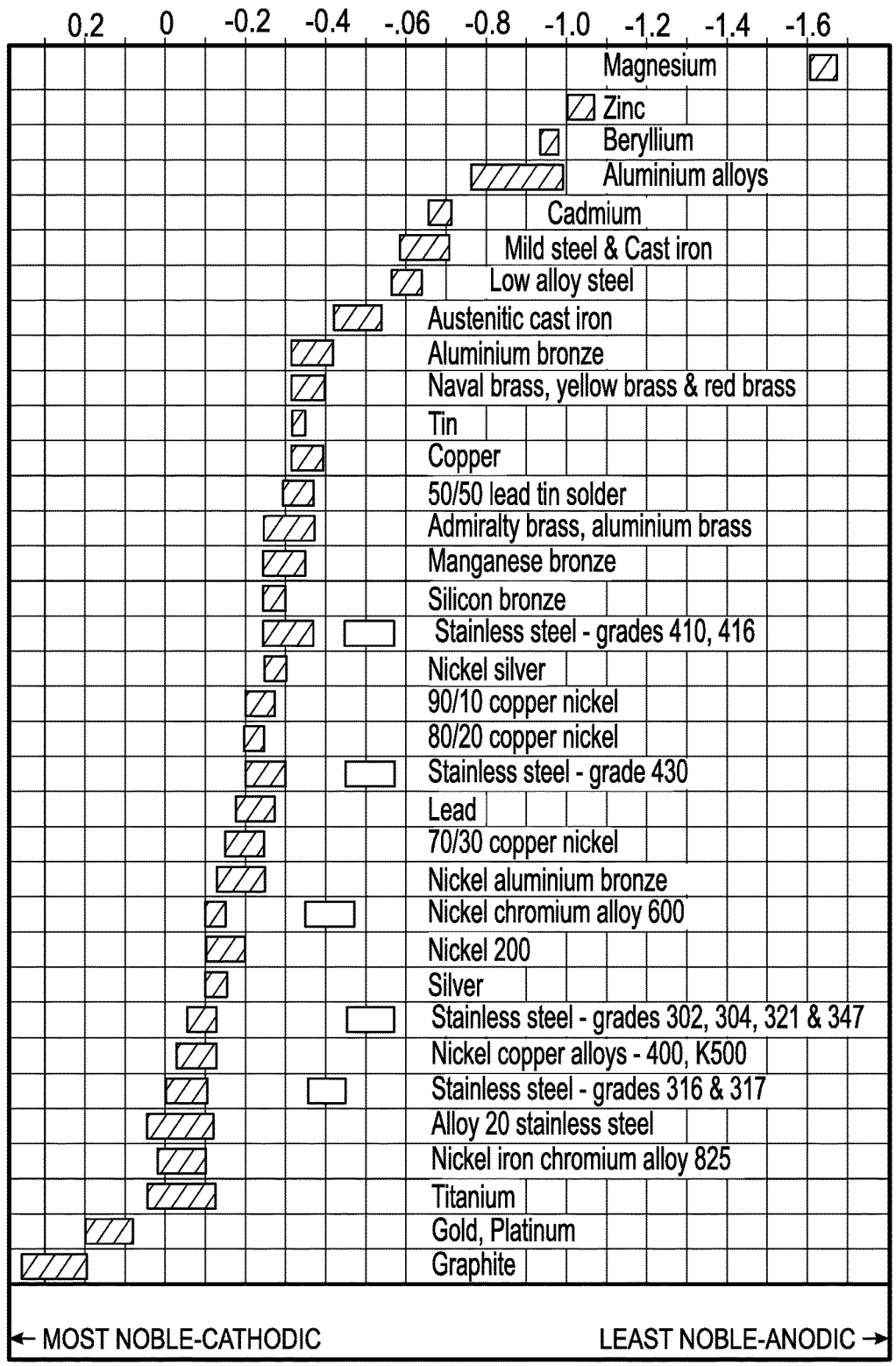
FIG. 3; depicts a reproduction of a galvanic chart of common materials

The screen 10 of the embodiment illustrated also includes a body 38 having a bore 42 therethrough within which the framework 14 and the substance 30 are positioned. The body 38 is made of a third material 46 that like the first material 18 is more anodic than the second material 34 such that the substance 30 is removed before the body 38 in an electrochemical reaction. In some embodiments, the third material 46 may actually be the same material as the first material 18. Good choices for the materials 18, 34 and 46 are based upon their locations on a galvanic chart of common materials shown in FIG. 3. The first material 18 and the third material 46 should be selected from more noble, or more cathodic, materials on the galvanic chart such as nickel, copper or steels, while the second material 34 should be selected from the less noble, or more anodic, materials such as alloys including one or more of zinc, beryllium and magnesium, for example. Assuring that the second material 34 is far from the first material 18 and third material 46 assures that the second material 34 is removed while not removing much if any of the first material 18 and the third material 46 when electrochemically reacted in an electrolyte. These electrolytes include fluids that may be anticipated to be in an environment where the screen 10 will be deployed, such as, in an earth borehole in a hydrocarbon recovery or a carbon dioxide sequestration application, for example. The electrolyte may be a naturally occurring fluid, such as salt-water brine, for example, or may be pumped to the desired location by an operator when needed.

Figure 4:
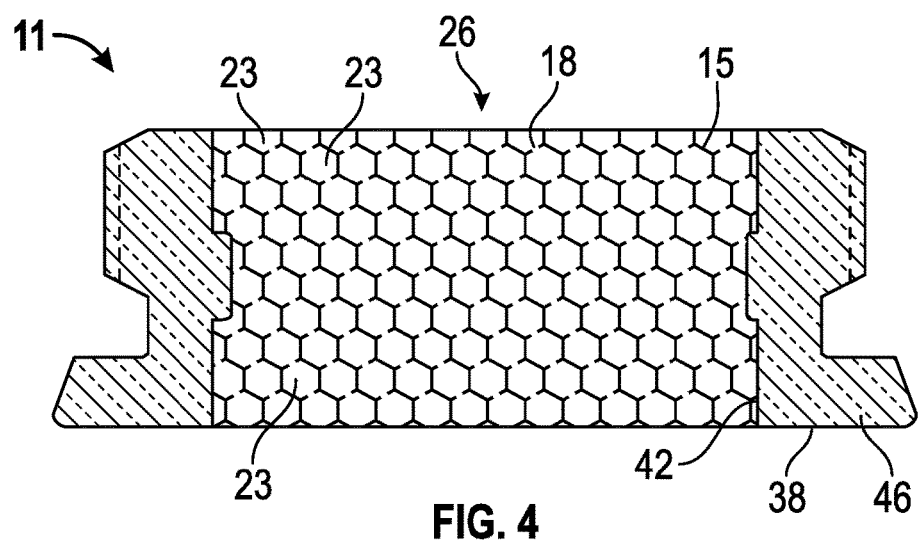
FIG. 4 depicts a cross sectional view of an alternate embodiment of a screen disclosed herein.

Referring to FIG. 4, an alternate embodiment of a screen disclosed herein is illustrated at 11. The screen 11 differs from the screen 10 in that the framework 15 is not random but instead has a regular and repeating pattern that defines regular and repeating openings 23 that are of consistent size and shape. The framework 15 may be made by filling spaces defined between a plurality of lattices that are stacked together (not shown) with the first material 18. After the framework 15 is made the lattices (fabricated of the second material 34) are dissolved and removed from the framework 15, thereby leaving only the framework 15 to serve as the screen 11 for filtering fluid flowable therethrough.

Figure 5:
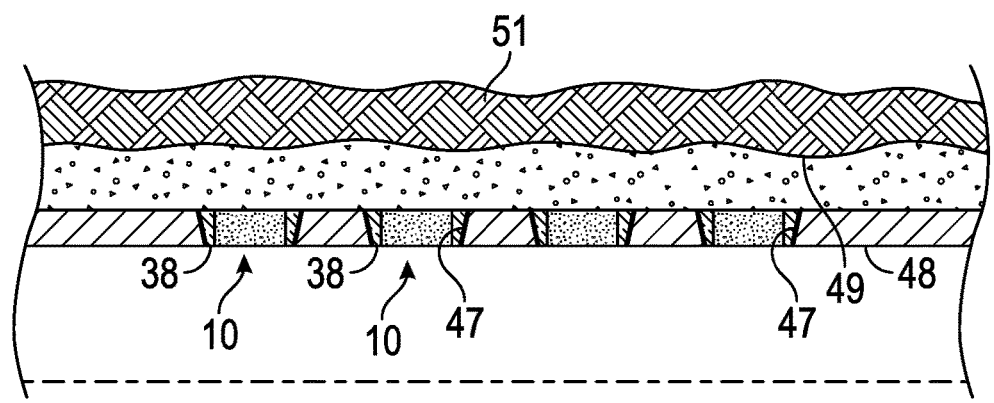
FIG. 5 depicts a cross sectional view of a plurality of the screens of FIG. 1 positioned in a tubular in an earth formation borehole.

Referring to FIG. 5, the screen 10 is illustrated in an application for which the screen 10, including the body 38, is well suited, the downhole completion industry. A plurality of the screens 10 are fixedly positioned within holes 47 in a tubular 48 positioned within a borehole 49 in an earth formation 51. In this application the tubular 48 can be positioned within the borehole 49 while the screens 10 are blocked to fluid flow therethrough by the substance 30. When desired, the screen 10 is exposed to an electrolyte to initiate the electrochemical reaction. Once the second material 34 is disintegrated the substance 30 can be removed from the screens 10 thereby leaving a plurality of filtered flow passageways (defined by the framework 14) through a wall 52 of the tubular 48.

One embodiment of the screen 10 disclosed herein is made with a brazing process. A plurality of particles 50, such as pellets or beads, for example, of the second material 34 are packed within the bore 42 and brazed together and to the body 38 with a filler metal 54. The filler metal 54 while molten fills the interstices 58 defined between the particles 50 before solidifying. Once the filler metal 54 is solidified it forms the framework 14. The filler metal 54 is made of the first material 28 while the particles 50 are made of the second material 34. The particles 50 are removed during an electrochemical reaction when the screen 10 is exposed to an electrolyte leaving just the framework 14 with the openings 22 therethrough. The foregoing construction leaves the framework 14 with the openings 22 of various sizes and shapes that are somewhat random and form a torturous path for fluid to flow therethrough.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of making a screen comprising;
    brazing particles within a bore of a plug with a filler metal of a first material, the particles being of a second material and the plug of a third material, the second material being more anodic than either of the first material or the third material;
    exposing the particles, the plug and the filler metal to a fluid;
    allowing an electrochemical reaction to occur; and
    removing the particles.

2. The method of making a screen of claim 1, further comprising filling interstices defined between the particles with the filler metal.

3. The method of making a screen of claim 1, wherein the fluid includes an electrolyte.

4. The method of making a screen of claim 1, further comprising selecting the second material to be more anodic than either the first material or the third material.

5. A method for making a screen comprising:
    disposing a material in a mass wherein the material defines interstitial spaces therein;
    depositing another material in the interstitial spaces during brazing, wherein the material is more anodic than the another material; and then
    dissolving the material during an electrochemical reaction leaving the another material as a fluid permeable framework.

6. The method as claimed in claim 5 wherein the material and the another material together are fluid impermeable.

7. The method as claimed in claim 5 wherein the dissolving is by exposing the material to an electrolyte.

8. The method as claimed in claim 7 wherein the electrolyte is naturally occurring.

9. The method as claimed in claim 5 wherein the brazing secures the material in place before dissolution of the material.

* * * * *